United States Patent
Lee et al.

(10) Patent No.: US 12,436,732 B2
(45) Date of Patent: Oct. 7, 2025

(54) METHOD AND APPARATUS FOR CONTROLLING AUDIO DATA BY RECOGNIZING USER GESTURE AND POSITION USING MULTIPLE MOBILE DEVICES

(71) Applicant: TECHFLUX, INC., Seoul (KR)

(72) Inventors: Daehee Lee, Seoul (KR); Hanjoon Ahn, Seoul (KR)

(73) Assignee: Techflux, Inc., Seoul (KR)

( * ) Notice: Subject to any disclaimer, the term of this patent is extended or adjusted under 35 U.S.C. 154(b) by 0 days.

(21) Appl. No.: 18/244,428

(22) Filed: Sep. 11, 2023

(65) Prior Publication Data

US 2023/0418550 A1    Dec. 28, 2023

Related U.S. Application Data

(63) Continuation of application No. 15/475,738, filed on Mar. 31, 2017, now abandoned, which is a continuation of application No. PCT/KR2015/010315, filed on Sep. 30, 2015.

(30) Foreign Application Priority Data

Oct. 2, 2014    (KR) ........................ 10-2014-0133491

(51) Int. Cl.
*H04S 7/00* (2006.01)
*G06F 3/01* (2006.01)
*G06F 3/16* (2006.01)

(52) U.S. Cl.
CPC .............. *G06F 3/165* (2013.01); *G06F 3/017* (2013.01); *H04S 7/301* (2013.01); *H04S 7/302* (2013.01); *H04S 7/303* (2013.01)

(58) Field of Classification Search
None
See application file for complete search history.

(56) References Cited

U.S. PATENT DOCUMENTS

| | | | |
|---|---|---|---|
| 5,892,817 A * | 4/1999 | Will | H04M 11/027 379/418 |
| 10,748,529 B1 * | 8/2020 | Milden | G10L 15/22 |
| 2004/0151476 A1 | 8/2004 | Suzuki | |
| 2005/0152557 A1 | 7/2005 | Sasaki et al. | |
| 2007/0133813 A1 | 6/2007 | Morishima | |
| 2007/0211907 A1 | 9/2007 | Eo et al. | |
| 2008/0045140 A1 | 2/2008 | Korhonen | |
| 2008/0077261 A1 * | 3/2008 | Baudino | H04M 1/72412 700/94 |
| 2008/0226087 A1 * | 9/2008 | Kinghorn | H04S 7/301 381/59 |

(Continued)

FOREIGN PATENT DOCUMENTS

| | | |
|---|---|---|
| EP | 1443804 B1 | 11/2007 |
| EP | 1703772 B1 | 8/2014 |
| KR | 1020080075351 A | 8/2008 |

*Primary Examiner* — Irete F Ehichioya
*Assistant Examiner* — Samuel Shen (57) ABSTRACT

A method or apparatus for multi-channel audio data control using plural mobile devices comprising steps of detecting user presence through assigned frequency, transmitting audio data to the nearest device from the user based on user presence information, and recognize user gesture to control the audio data. A remote controller held by the user may also have a priority to control audio data.

6 Claims, 7 Drawing Sheets

(56) References Cited

U.S. PATENT DOCUMENTS

| | | | |
|---|---|---|---|
| 2008/0232608 A1* | 9/2008 | Ullmann | H04S 7/302 |
| | | | 381/77 |
| 2010/0008516 A1 | 1/2010 | Ichikawa et al. | |
| 2013/0154919 A1 | 6/2013 | Tan et al. | |
| 2013/0294618 A1 | 11/2013 | Lyubachev | |
| 2014/0205105 A1 | 7/2014 | Cleve et al. | |

* cited by examiner

METHOD AND APPARATUS FOR CONTROLLING AUDIO DATA BY RECOGNIZING USER GESTURE AND POSITION USING MULTIPLE MOBILE DEVICES

CROSS-REFERENCE TO RELATED APPLICATIONS

The present invention is a Continuation application of currently pending U.S. patent application Ser. No. 15/475,738 having a Filing Date of 31 Mar. 2017 claiming a Priority Date of 2 Oct. 2014. The U.S. application Ser. No. 15/475,738 is a Bypass Continuation application of International Application Number PCT/2015KR/010315 having an International Filing Date of 30 Sep. 2015 and designating United States. The International application claims priority to an earlier filed Korean Patent Application Number 10-2014-0133491 having a Filing Date of 2 Oct. 2014. The entire content of all of the aforesaid US patent application, International Patent Application, and the Korean Patent Application are incorporated herein by reference. The applicant claims the benefit of and claims priory to all of these aforesaid US patent application, International Patent Application, and the Korean Patent Application, and their Filing Dates and Priority Dates.

BACKGROUND OF THE INVENTION

Field of the Invention

The present invention is related to a method or an apparatus for forming a wireless network between plural mobile devices and control audio data based on user position and gesture data.

Related Art

A 5.1ch surround audio system, e.g., a home theater system is an expensive and fixed speaker system with front, rear speakers and woofer, which can be manually placed in a living room or other places. Mobile audio devices such as wireless speakers or mobile phones are sometimes located in present with the multi-channel audio system, but individual devices are not connected each other with a wireless network. At this point in time, individual devices can be connected to a central controller with a wireless connection, such as WiFi and Bluetooth, but a new setting for the central controller is required for each movement of any device since a reproducing channel for each device is fixed.

Functions of the surround system, that selectively reproduces and automatically transmits audio data when a user approaches to a device and control the system easily with gestures, have never been suggested before.

SUMMARY OF THE INVENTION

In recent years, smart mobile devices are implemented with high technology functions with a loud speaker which can reproduce sound up to 20,000 Hz, an advanced microphone and a gyro scope which can recognize motions of mobile devices. Also, a data transmission between mobile devices has never been easier with WiFi/Bluetooth. Thus, what is needed is a method and an apparatus for data control and data communication between smart mobile devices in accordance with a preferred embodiments of the present invention

DETAILED DESCRIPTION OF THE INVENTION

In various embodiments, the first embodiment may comprise a method of a user position detection and gesture recognition for audio data control using plural mobile devices.

A mobile device may have a transceiver, which contains a long distance wireless communication module for voice call and a short distance wireless communication module for network formation with surrounding devices.

The mobile device may have a speaker (loud speaker), to regenerate audio or to transfer inaudible high frequency for transmitting distance calculation data to surrounding mobile devices and detecting user position and gesture, and a microphone, to receive inaudible high frequencies from surrounding mobile devices and reflected signals for user position and gesture recognition.

According to one of embodiments of the present invention, the mobile device may have a sensor module that contains an accelerometer to detect its position change, a gyroscope, an image sensor, and a magnetometer to detect user's moving direction.

According to one of embodiments of the present invention, the mobile device may also have a memory module to save audio data, and a CPU to control above mentioned modules According to one of embodiments of the present invention, plural mobile devices form a wireless network each other, using short distance wireless communication module such as Bluetooth and Wi-Fi. The mobile devices generate signals for distance calculation, receive reflected signals from the generated signals, and calculate distance and position of each device using time difference between generating and receiving signals, triangular measurements and characteristics of frequency difference of received signals.

When controlling audio channel data, at least one of the mobile devices may detect whether a user is moving or not and decide audio regeneration from mobile device, and recognize one of various user's control gestures representing play, pause, next, previous, etc.

The method of detecting user position and recognizing control gesture includes, receiving reflected signal of inaudible high frequency, generated by a speaker, a microphone or a signal detector, and automatically decides information of frequency changes according to the Doppler effect or recognizing transmitted signal from an accessory device held by a user or the magnetometer sensor.

When transmitting audio data to plural mobile devices, regeneration time synchronization information may be contained.

When any movement of at least one of the mobile devices is detected by the Gyro sensor, image sensor, or any contained sensor modules during regeneration of audio data, decision of recalculation device position is performed with volume control, audio channel control for regeneration time synchronization without user controls. If the position change range is more than a certain threshold value or any mobile device receives a call, at least one of the mobile devices (a master device) should detect stopped device/devices to reflect in audio data control.

When deciding control of audio data based on user gesture recognition, a mobile device may transmit control signal to a master device. The signal may have its unique frequency with unique code form messages for various purposes without using wireless network communication. Also, the method of transmitting and controlling audio data can be performed with a certain accessory devices, such as a smart watch or a remote controller.

According to one of embodiments of the present invention, one of plural mobile devices automatically detects user's presence to transfer audio data to proximate wirelessly connected devices and recognizes user gestures to control audio data. Furthermore, audio data control may be performed with a remote controller located near a user.

Figure 1:
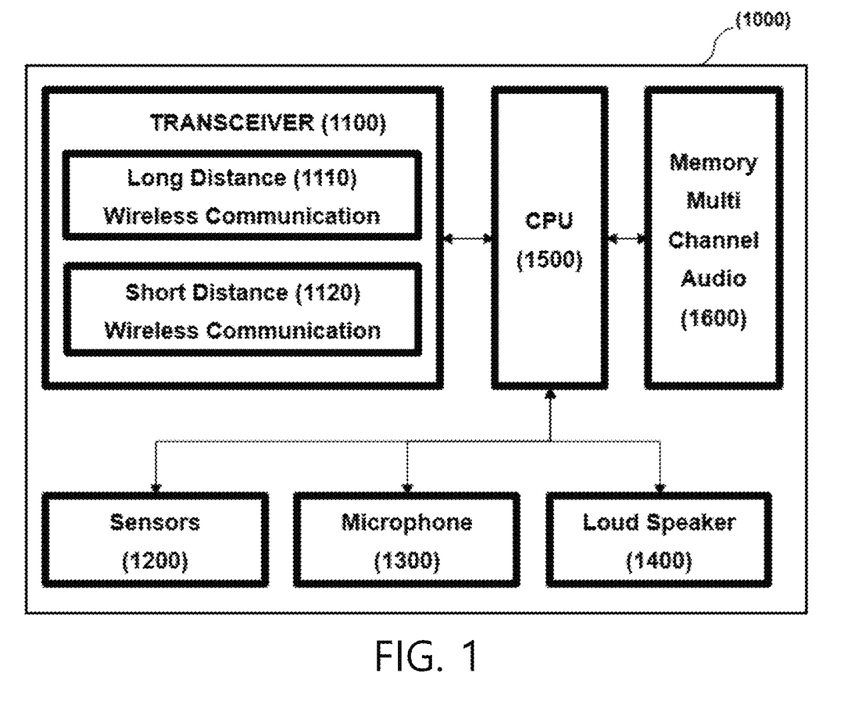
FIG. 1 is a block diagram of a mobile device in accordance with one or more embodiments of the present invention.

FIG. 1 is a block diagram of a mobile device in accordance with one or more embodiments of the present invention.

FIG. 1 is a suggesting an implementation of the mobile device which can have functions of a multi audio channel distribution and audio data control by gesture recognition for plural mobile devices. The mobile device (1000) may have a transceiver (1100), which contains at least one of a long distance wireless communication module (1110) for voice call or a short distance wireless communication module (1120) for network formation with surrounding devices.

The mobile device may have a microphone (1200), to receive a reflected inaudible high frequency signal for calculating a relative distance of at least one of surrounding devices or for recognizing user gesture, and a speaker (1300), e.g., a loud speaker for reproducing sound using audio data, transmitting a gesture recognition signal and a distance calculation signal to devices in a network using a inaudible high frequency signal.

Also, the mobile device (1000) may have a sensor module (1400) that contains an accelerometer to detect its position change, a gyroscope, an image sensor, and a magnetometer to detect user's moving direction.

Recognition of a gesture and detection of a position is executed by detecting reflected frequency and its frequency changes according to the Doppler Effect.

Also, the mobile device (1000) may also have a memory module (1500) to save audio data, and a CPU (1600) to control above mentioned modules. This memory module (1500) may also include a non-volatile memory.

According to one of embodiments of the present invention, a mobile device, for controlling audio data, may have a memory for saving audio data, a transceiver for forming network with surrounding plural mobile devices, a speaker for reproducing audio and transmitting a inaudible high frequency signal which is used for detecting user, or device position and recognizing user gesture, a microphone for receiving sound or receiving inaudible high frequency for user gesture recognition and user position detection, a CPU, and a sensor module that contains a gyro sensor for detecting position change of a mobile device, an image sensor, and magnetic sensor for detecting user position.

The CPU controls a network formation with surround plural mobile devices, receives signals from the mobile devices for distance calculation and user presence detection, calculates positions of the mobile devices based on received signal information, detects user's position based on the received user detection signal and controls audio data of at least one of mobile devices based on calculated user position or mobile devices' position information.

Also, the mobile device CPU for audio data control may also control network formation between plural devices. A CPU of the first device from the devices in the formed network, may distribute different inaudible frequencies to devices to prevent interferences between frequencies and decide audio data transmission to the device that detected user's position.

A CPU of the second device from mobile devices in the formed network can detect user presence, based on received user detection signal that is received by a microphone or a wireless network, and the received detected signal can be sent to the first mobile device.

A CPU of at least one mobile device in the formed network recognize user gesture and execute audio data control, such as play, pause, next, previous, or playlist control based on the recognized gesture.

According to one of embodiments of the present invention, the mobile device may also have a gyro sensor for position change of itself and a magnetometer sensor for user position detection.

According to one of embodiments of the present invention, the mobile device can receive user detection signal and gesture signal from an accessory device which is located near a user.

In other words, the mobile device for audio data control, which is interoperable with plural mobile devices, may have a transceiver for network formation with the surround plural devices, a memory for saving audio data, a speaker, a microphone for receiving sound and CPU. The CPU may executes actions, based on user presence detection signal and position information of mobile devices, such as control audio data by recognizing user gesture, decide transmission of audio data to the mobile devices, and transmit signal to at least one of mobile devices in the network. A method for transmitting signal to at least one mobile device, based on user presence detection signal and position information of mobile devices, could be one of transmitting method such as Wi-Fi, ad-hoc, or Mesh Network. Also, the signal could be transmitted using inaudible frequency.

Also, the mobile device, which is interoperable with plural mobile devices, to control audio data may have a transceiver for network formation with the plural mobile devices, a memory for saving audio data, a speaker, a microphone for receiving sound and a logic circuit. The logic circuit may control audio data by recognizing user gesture, receive audio data from at least one device of the plural mobile devices, and transmit a signal to at least one device of the plural mobile devices based on position information of the mobile device and the user gesture. A method for transmitting signal to at least one mobile device by the logic circuit could be one of transmitting method such as Wi-Fi, ad-hoc, or Mesh Network. Also, the signal could be transmitted using inaudible frequency.

User detection information could be calculated using reproduced signal from the speaker. Furthermore, the mobile device may have an accelerometer to acquire user detection information, a gyroscope, an image sensor, and a magnetometer to detect user's moving direction. Also, the signal can be transmitted using either a transceiver or a speaker, when the signal is based on user detection information.

Figure 2:
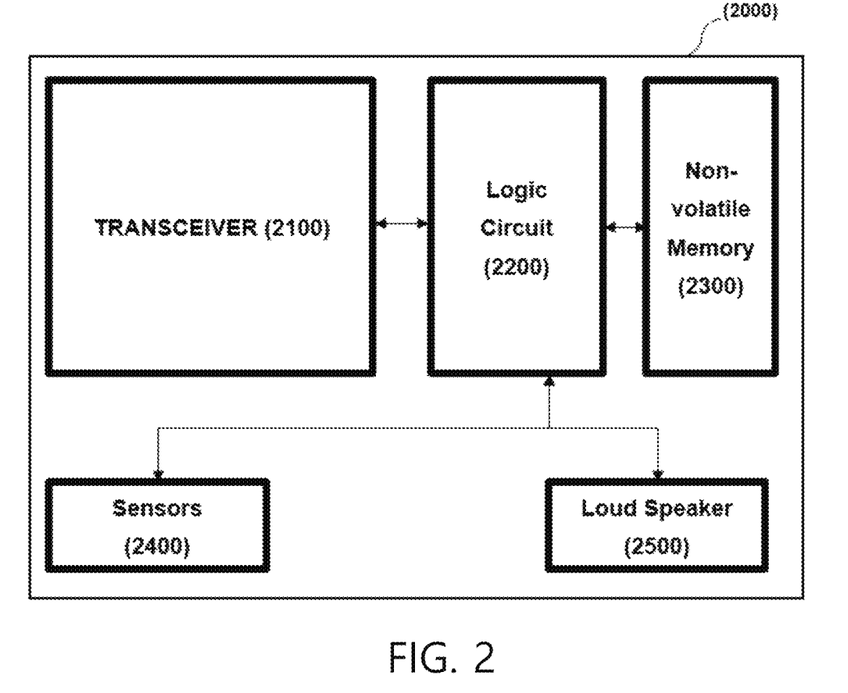
FIG. 2 is a block diagram of an accessory device in accordance with one or more embodiments of the present invention.

FIG. 2 is a block diagram of an accessory device (2000) in accordance with one or more embodiments of the present invention In FIG. 2, a block diagram of an accessory device (2000), which can be interoperable with a mobile device for audio data control based on user gesture recognition and user detection information using plural mobile devices, is presented. The Accessory device (2000) may be simply called as an 'accessory'. The accessory device (2000) may have a logic circuit to control plural modules which includes a transceiver (2100) for transmitting recognized user gesture information to a mobile device, sensor modules that includes sensors such as a gyro sensor, and a speaker for transmitting accessory position signal or gesture information to a mobile device using inaudible high frequency. Furthermore, the accessory (2000) may have a non-volatile memory to save position and gesture information.

According to one of embodiments of the present invention, the accessory may transmit inaudible high frequency when transmitting user detection signal or gesture information to a microphones of mobile devices, and transmitted signals are distinguished by unique frequency or in form of Morse codes.

The accessory could be wearable device such as a smartwatch. Also this accessory may be called as a 'remote controller'. The accessory may or may not be connected with at least one mobile device in formed network. Also, the accessory might have assigned unique frequency in manufacturing step regardless of an assigned frequency by a master device. It could not receive assigned frequency from the master device since some accessory devices do not have network communication function.

According to one of embodiments of the present invention, a transceiver or a microphone of mobile device may receive signal based on user detection signal from the accessory.

According to one of embodiments of the present invention, the remote controller device for audio data control using mobile device may have a sensor for gesture recognition and a speaker for generating signals for distinguish the user gesture based on recognized sensor information. Remote controller device may control audio data.

According to one of embodiments of the present invention, the remote controller device for audio data control using mobile device may have a transceiver for formation of a network with a mobile device or a group of mobile devices, a sensor for gesture recognition and a speaker for generating signals for distinguish user gesture based on recognized sensor information. Remote controller device may control audio data. The speaker may generate different signals depends on user gesture based on sensor information. Also, the speaker may generate unique code signal for user gesture based on sensor information. The distinguished Frequency information for signal transmission may be received by the transceiver through wireless network.

Figure 3A:
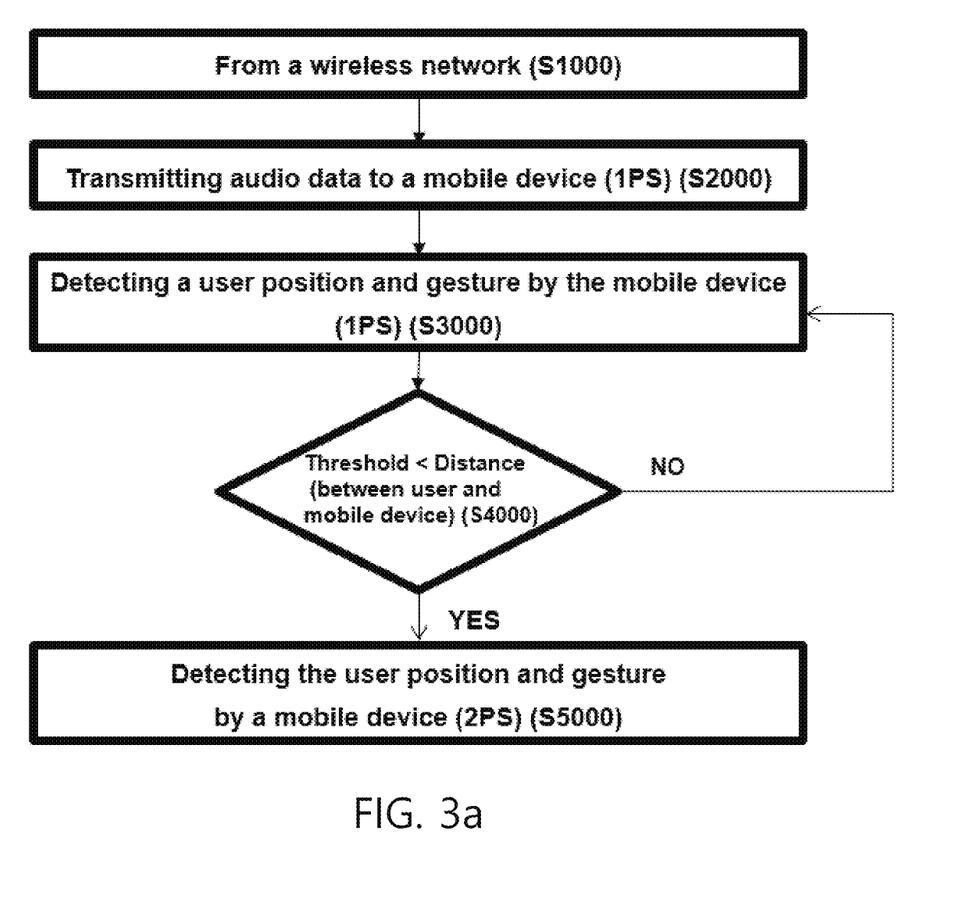
FIG. 3a is a flowchart of an audio data control method based on position detection information of plural mobile devices in accordance with one or more embodiments of the present invention.

FIG. 3a is a flowchart of an audio data control method based on user detection information of plural mobile devices in accordance with one or more embodiments of the present invention. Audio data control steps may include network formational step (s1000) between plural mobile devices, audio data transmission step (s2000) from a master device to an audio reproducing mobile device (1PS), audio function control step (s3000) for user detection information and gesture recognition, distance measurement step (s4000) for checking threshold of distance between a user and the mobile devices and then determine which device is the closest, and transmitting audio data step (s5000) to the determined mobile device (2PS).

The mobile device may be called as a wireless device. From plural mobile devices, a master device may transmit audio data to the reproducing mobile device (1PS), and the mobile device (1PS) may detect a user presence and recognize gesture to control audio functions. Also, based on a distance between the mobile device (1PS) and the user, the closest mobile device (2PS) is determined if the distance is beyond a threshold, and transmit audio data to the determined the closest mobile device (2PS).

Figure 3B:
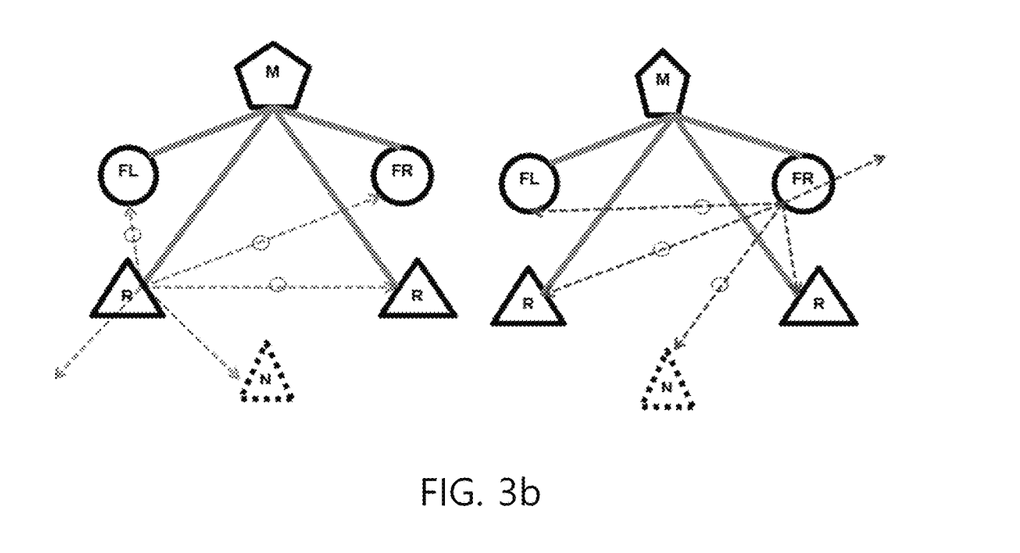
FIG. 3b or FIG. 3e is a schematic diagram for explanation of a communication with a master device and other devices in a network in accordance with one or more embodiments of the present invention.
Figure 3C:
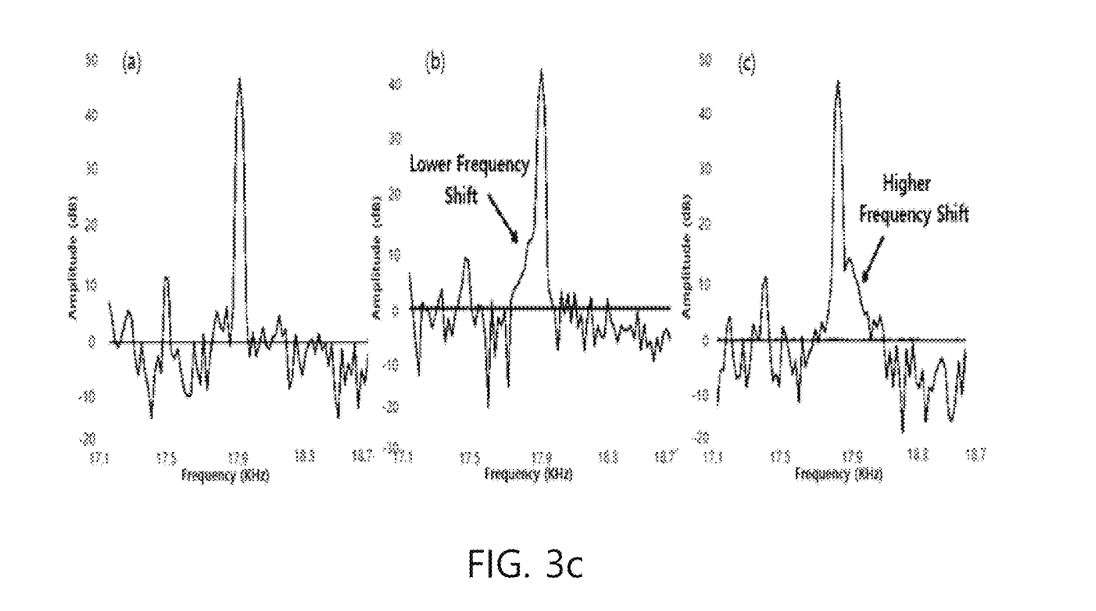
Figure 3D:
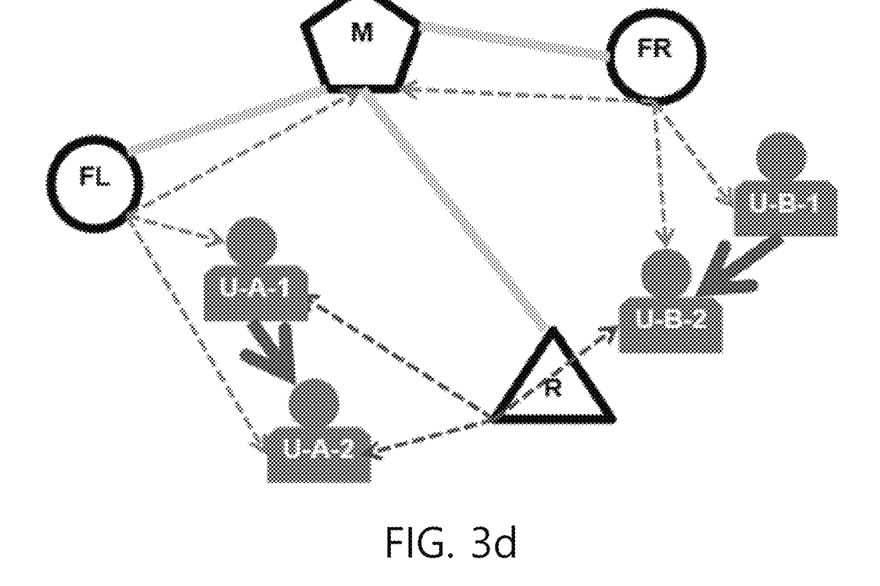
Figure 3E:
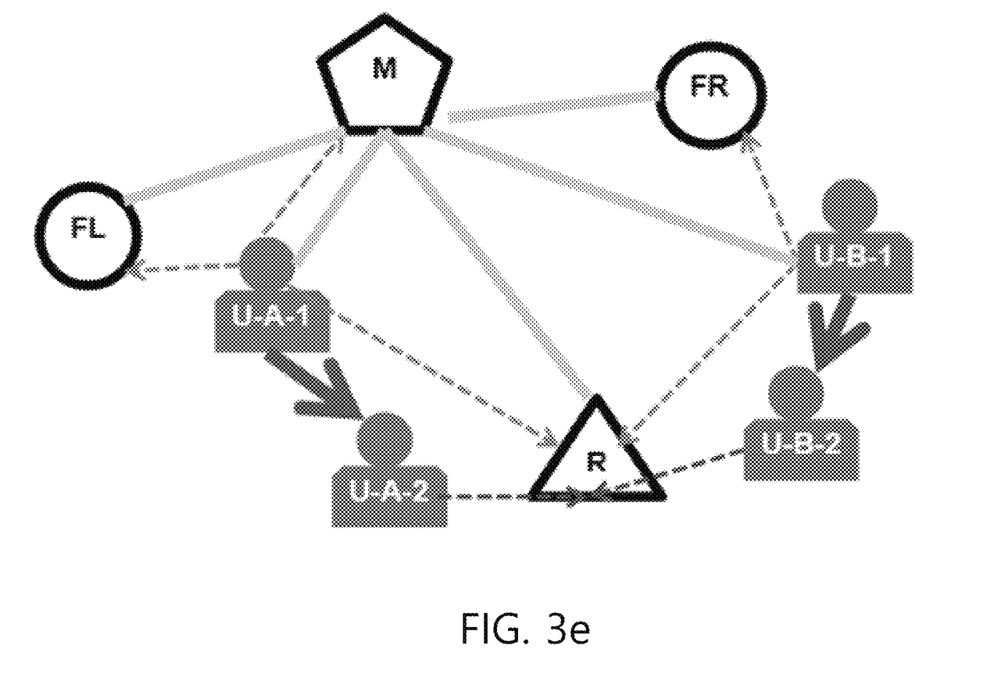

FIG. 3b or FIG. 3e is a schematic diagram for explanation of data transmission between a master device and other devices in a network.

Further information of the embodiment of the present invention is as follow: The system uses wireless network, such as Wi-Fi, each mobile devices are connected to the wireless network, and distance measurement between mobile devices is calculated using inaudible frequency signal.

The master device may function as an access point in the formed network. The master device may assign frequencies that slave devices use and to itself. And then, the master device may request signal transmission to each mobile device using inaudible high frequency or Wi-Fi wireless signal. The master device may decide sub-master device by determining the closest and the farthest device from it, based on received inaudible frequency signal from each device. The master device may request saved data from sub-master device to minimize overload to calculate an each position of each device.

Transmitted information may include transmission time information of sub-master device and time signal information of other slave devices. The master device may calculate relative positions based on the received information between devices in the network. The master device may distribute audio channel and transmit audio data through the assigned channels based on the calculated relative positions. Advantages when using inaudible high frequency for communication between devices are following:

Battery life will be increased compared to using wireless network between mobile devices.

Signal interruption will be decreased between mobile devices, since each mobile device are assigned with unique inaudible high frequency.

Also, there could be more advantages, when assigning different frequencies to mobile devices for distance calculations each other.

Unlike Wi-Fi/Bluetooth communication, transmitting and receiving could be performed at the same time.

Unlike Wi-Fi/Bluetooth communication, direct communication between mobile devices is possible without an access point (AP).

When transmitting and receiving with assigned frequency to a mobile device, building communication network may be simpler since the mobile device only need to respond to its own frequency. However, assigned frequency to each mobile device information must be informed to the mobile device beforehand.

With the assigned inaudible high frequency, a mobile device may create different messages in a form of unique code for bi-directional communication. A Morse code could be one example of the unique code and may be created by inaudible high frequency.

Aforementioned information will be further explained below, refer to FIG. 3b and FIG. 3e. FIG. 3b or FIG. 3e is a schematic diagram for explanation of data transmission between a master device and other devices in a network.

FIG. 3b is formed with a master device (M), a front-left (FL), a front-right (FR), a rear-left (RL), a rear-right (RR) and a new device (N). When calculating distances of each devices using Wi-Fi, it is impossible to measure distances between RL-FL, RL-FR, RL-RR, since direct communication between devices is not supported. However, if the inaudible frequency is used to distance measurement with broadcasting signals from RL or FR like FIG. 3b, it is possible for an each device to save receiving time of the broadcasted signals from every surrounding device in the network. Also, it is possible to determine which devices transmitted signals, if a unique frequency has been assigned to each device. Therefore, if every slave device (FL, FR, RL, RR) transmits distance information to the master device after transmits signals for distance measurement and then save received signals from other devices, the master device is now able to calculate relative position of each device. Also, the master device may determine the closest and the furthest device and calculate positions of mobile devices only using determined devices (RL, FR) to minimize overload for the calculation. In conclusion, the master device may assign audio channel to each device based on the calculated positions of plural devices and transmit audio data refer to the assigned audio channel. Also, it is easy to assign audio new channel to a new device (N) in FIG. 3b, and it is possible to re-assign audio channels for moved device which has assigned channel since the movements of device may be detected by its gyro sensor and transmits the movement information to master device.

A method of recognizing user gesture using inaudible high frequency, in accordance with one of the embodiments of the present invention, could be explained refer to FIG. 3c.

FIG. 3c is a reflection waveform diagram of inaudible high frequency for user gesture recognition.

The Doppler Effect may be used for gesture recognition using inaudible high frequency. The Doppler Effect is a frequency changing effect when a user gets closer or further from a microphone. Also, amount of frequency change is relative to speed of an object.

When there is no movement of the user like FIG. 3c, a reflected waveform is detected as a one peak like (a) of FIG. 3. When the user gets further, the reflected waveform moves to a lower frequency range like (b) of FIG. 3c and when the user gets closer, the reflected waveform moves to a higher frequency range like (c) of FIG. 3c. Therefore, user gesture could be recognized by analyzing reflected waveform.

It is simpler to use inaudible high frequency for gesture recognition than using infrared camera since it is applicable with pre-installed microphone and speaker in a mobile phone with reduced calculation amount, and it is also applicable with wireless speaker with additional microphone.

According to one of embodiments of the present invention, explanations of the position detection method are as follow:

FIG. 3d. is formed with a master device (M), a front-left speaker (FL), a front-right speaker (FR), a rear-left speaker (RL), a rear-right speaker (RR), the 1st position of A-user (U-A-1), the 2nd position of A-user (U-A-2), the 1st position of B-user (U-B-1), and the 2nd position of B-user (U-B-2). Also, each devices are connected with wireless network, such as Wi-Fi, the master device assigned unique frequency to each device. At the moment, the FL speaker is the closest when the A-user is positioned at U-A-1. At this situation, the FL speaker and RR speaker transmit inaudible high frequency and receive reflected signal from each device to detect user presence. Based on user detection, FL and RR device may transmit related information to the master device and the master device decides the closest device from the user to send resultant information to a corresponding device.

Another embodiment is when A-user moves from U-A-1 to U-A-2 and the closest device becomes the RR device. At the same time, when B-user moves from U-B-1 to U-B-2, the closest device to B-user becomes RR devices. At this moment, user level is considered for determine which user to control RR device. If A-user has a higher level for device usage and when A-user moves from U-A-1 to U-A-2 while listening to an audio from the FL device, the master device controls the audio data listened by A-user to be reproduced from the RR device. Therefore, B-user does not have a permission to control the RR device if A-user is at the present.

FIG. 3e is represents when a user is wearing/holding an accessory device. An accessory device may include a transceiver for wireless network, a speaker, and a microphone. The wearing/holding accessory device may be connected to a network to receive audio channel or assigned frequency information of other devices from a master device.

A difference between the FIG. 3d and the embodiment is that a wearing/holding accessory device transmits signals to mobile devices (FL, FR) with the assigned frequency when a user is near each mobile device. Mobile devices (FL, FR) may receive the signals and create user detection information of A-user and B-user. Also, when both A-user and B-user get close to the RR device at the same time, a user with higher usage level, may have permission to control audio data of the RR device. For this, the master device or the RR device may request ID of each users' accessory device for distinguish level and each accessory device may answer with its assigned frequency.

Figure 4:
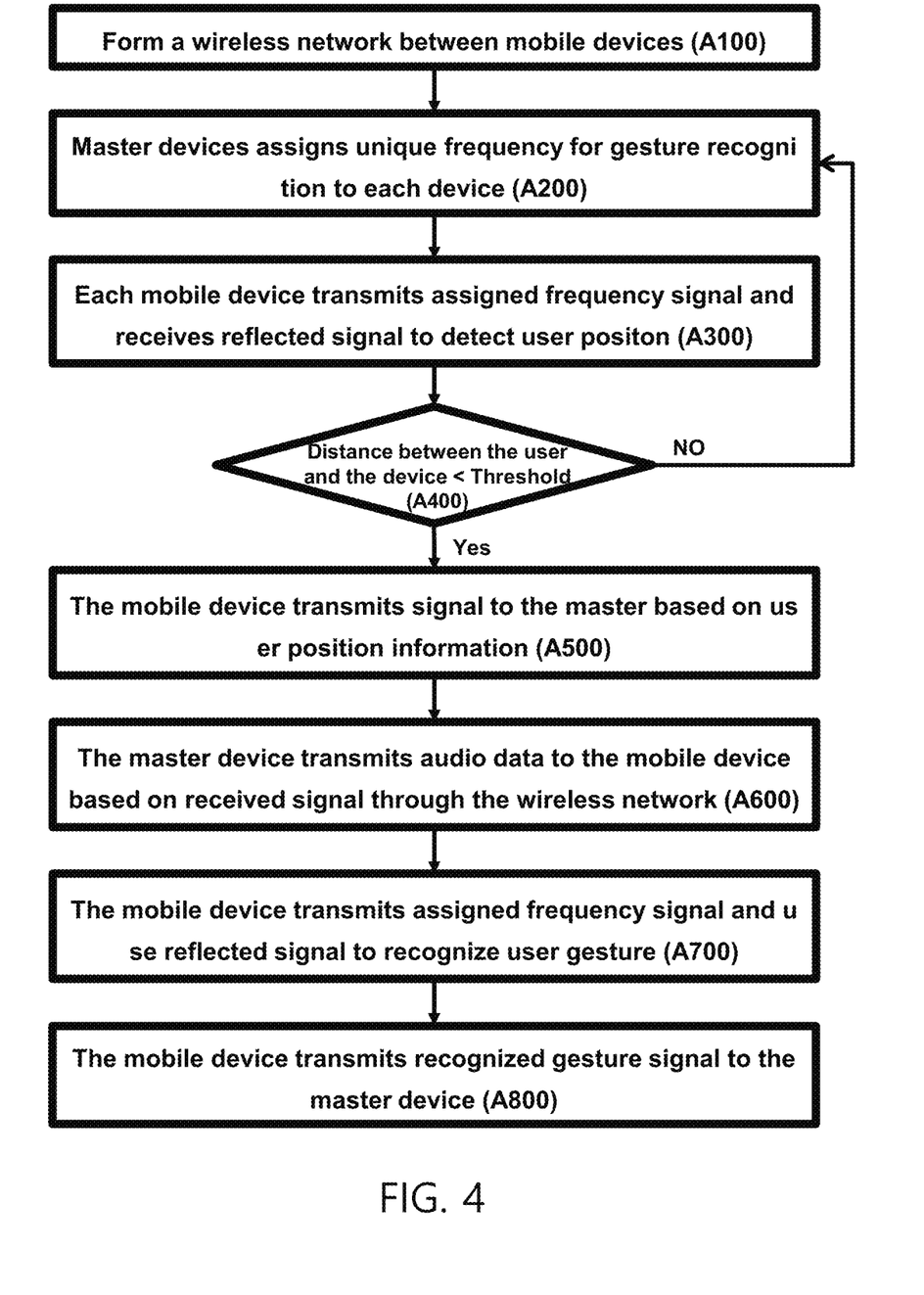
FIG. 4 is a flowchart of an audio data transmitting method for receiving and sending signal between master device and other devices based on information of detected device positions in accordance with one or more embodiments of the present invention.

FIG. 4 is a flow diagram of an audio data transmitting method between a master device and surrounding devices based on user detection information of plural devices.

According to one of embodiments of the present invention, the plural mobile devices with short-distance communication module (1120) for Bluetooth and Wi-Fi, may form a wireless network each other. At this moment, the master device becomes an AP for network formation with plural mobile devices, decide network connection with mobile devices, and decide receiving and transmitting data between the master and mobile devices. In the present invention, the master device is an AP and controller to deployment of mobile devices based on the user detection information of plural mobile devices.

One of the plural mobile devices may assign frequencies to other mobile devices in the network (A200). Each mobile device may generate user detection signal by transmitting assigned frequency and receiving reflected signals. The frequency assignment to each device is to prevent signal interferences which might happen when devices use the same frequency. Each mobile device may transmit signals with the assigned frequency using speaker, and generate user presence detection information by analyzing frequency change of received reflected frequency by user presence or user gesture (A300). For the user presence detection information, the master device or mobile devices may receive inaudible high frequency transmitted from an accessory device proximate to a user or a magnetometer sensor may be used. Mobile devices may monitor if a user is in certain threshold in distance (A400). Mobile devices may transmit a signal based on user presence detection signal, to the master device (A500). The master device may decide a mobile device to receive audio data based on the received signal. The master device may transmit audio data through formed wireless network to decided device (A600). The step A600 of FIG. 4 is when the audio data is saved in the master devices. If the audio data is saved in another device, the master device may request the device to transmit the data to the decided device.

The audio data transmitting method may include several modes. For examples, a master device could transmit, a master device request data transfer to a device that has audio data, or request a audio data to a reproducing (1PS) mobile device.

Decision of reproducing audio method may also include several modes. For examples, each mobile device may detect a user presence and reproduce audio data from the closest mobile device to the user and another mobile device may reproduce audio data continuously when a user gets close to the device. When reproducing audio continuously, the audio data may be transmitted from a previously reproducing mobile device, a mobile device that originally has the data, or the master device.

And another example is that each device may continuously reproduce each selected audio data from where it play/paused based on user detection information, when a user came back to each device. At this moment, User ID detection function may be needed. The mobile device may use assigned frequency to transmit signal through a speaker, and detect user gesture by receiving reflected frequency based on user gesture (A700). At this moment, user gesture recognition is available with accelerometer or gyro sensor in an accessory device, and the recognized gesture by the accessory device may be transmitted, in form of unique frequency or Morse code for each gesture, to the mobile device. Furthermore, it may transmit to plural mobile devices that are in certain threshold distance with a user, to reproduce the audio data at the same time. The mobile device may transmit user gesture recognition result to the master device (A800).

According to one of embodiments of the present invention, the audio data control method between plural mobile devices is comprised of: a step of network formation between the plural mobile devices, a step of user presence detection by the 2nd mobile device from the plural mobile devices, a step of transmitting signal, which is based on detected user position information, from the 2nd mobile device to at least one of the plural mobile devices in the network, and a step of deciding audio data transmission from the 1st mobile device of the plural mobile devices based on the information received from the 2nd mobile device. Also, the 1st mobile device may order the 3rd device, which has the original data, to transmit its audio data to the 2nd mobile device or other devices. In such case, order may be transmitted through the network with unique frequency, such as a Morse code.

The plural mobile device may recognize user gesture and perform one of controls from: play, pause, next, previous, or playlist control. In other words, transmitted signal by the 2nd mobile device could be broadcasting signal and the signal, based on user detection signal by the 2nd mobile device, may be transmitted to at least one of the plural mobile devices in the network.

The 2nd mobile device may transmit the signal based on user detection signal, to the 1st mobile device, if the 2nd mobile device is located in a certain threshold of distance with a user, and the 2nd mobile device may transmit the signal to the 1st mobile device if the user gets further from the 2nd mobile device.

When the 1st mobile device decides audio data transmission, it may decide to transmit audio data to at least one mobile device in the network which is located at certain threshold from a user.

A mobile device may transmit inaudible high frequency and receive reflected inaudible high frequency that is created by user gesture to recognize user gesture.

When a mobile device generates a user detection signal, each mobile device uses signals that is recognizable each other and the 1st mobile device may decide signal transmitting frequency of at least one mobile device.

It may recognize user gesture or detect user position using transmitted signals from an accessory device near a user. At this moment, a unique frequency or a code (ex. A sound Morse code) may be transmitted which distinguished by user gesture.

When the user is wearing a specific accessory device, user position is detected with a signal that is generated by an accessory device like one of the embodiments in the present invention. Also, instead of using the signal transmitting method for user presence from the mobile device, magnetic sensor may be used by detecting magnetic change of surrounding circumstances. At this moment, each mobile device may have magnetic sensor.

When the user is wearing a specific accessory device for recognizing gesture, generated frequency from the accessory device for each gesture may different and audio data of a mobile device may be controlled with it. At this moment, gyro sensor in the accessory device may detect degree of its movement relevant to each gesture and differentiate transmitting frequency by recognized gesture result. In such case, the mobile device may receive the signal from the accessory device and recognize user gesture based on the signal. Furthermore, battery life of the mobile device may be saved by using inaudible high frequency instead of using formed wireless network. Also, when the accessory device transmits gesture signal, it could be transmitted just changing transmitting signal instead of changing transmitting frequency responsive to a user gesture. For examples, if the accessory device generates a Morse code for corresponding alphabet of each control: play (P), forward (F), backward (B) or stop (S), the mobile device located the closest from the accessory device may recognize the signal from its microphone. The A100 of FIG. 4 is a step of forming a network between plural mobile devices. One of main purpose of network formation is to transmitting audio data to the devices that is located at the closest from a user. At this moment, one device may be a master device if a wireless network communication is used, such as Bluetooth/Wi-Fi. Bluetooth/Wi-Fi communication must get through the master device when there is a communication between nodes for transmitting data, so other communication method may be used such as an Ad-hoc or a Mesh network when direct communication between each node is needed. However, if it is not data transmission between mobile devices, unique code transmission is possible, using assigned frequency for each mobile device, to transmit request or acknowledgement message. In the A200, the master device is distributing frequencies to each mobile device in the network. For example, the master device may assign inaudible high frequency 20000 Hz, 21000 Hz, and 25000 Hz to each mobile device and each mobile devices may transmit request and receive signals with assigned frequency and each request or acknowledgement may be in various form such as a Morse code. Also, assigned frequency may be used only for transmission with modified method. Therefore, the master device may consider number of mobile devices in the network to assign frequencies properly.

A300, A400 and A500 of FIG. 4 are representing activation of a mobile device near a user. The A300 is a step of transmitting signal with assigned signal to a mobile device, detecting user movement with frequency changes of reflected signal, and detecting distance between user and the mobile device by characteristics of the reflected signal. Also, there is a need for audio data control by recognizing user gesture when the mobile device is near a user (A400) like in A700. In the A500, the mobile device may transmit a signal based on user detection information to a master device and the master device may decide an audio data receiving mobile device based on the received signal.

In the A800 of FIG. 4, the mobile device may transmit user gesture recognition result to the master deice. Transmitting method may be the formed wireless network between mobile devices or signals of assigned frequency. When the signals of frequency is used for audio data control transmission, it may be transmitted in unique code. Also, in transmitting and receiving for using signals of frequency, the same frequency may be used and the frequency may only be used for transmitting data or for other purposes.

Figure 5:
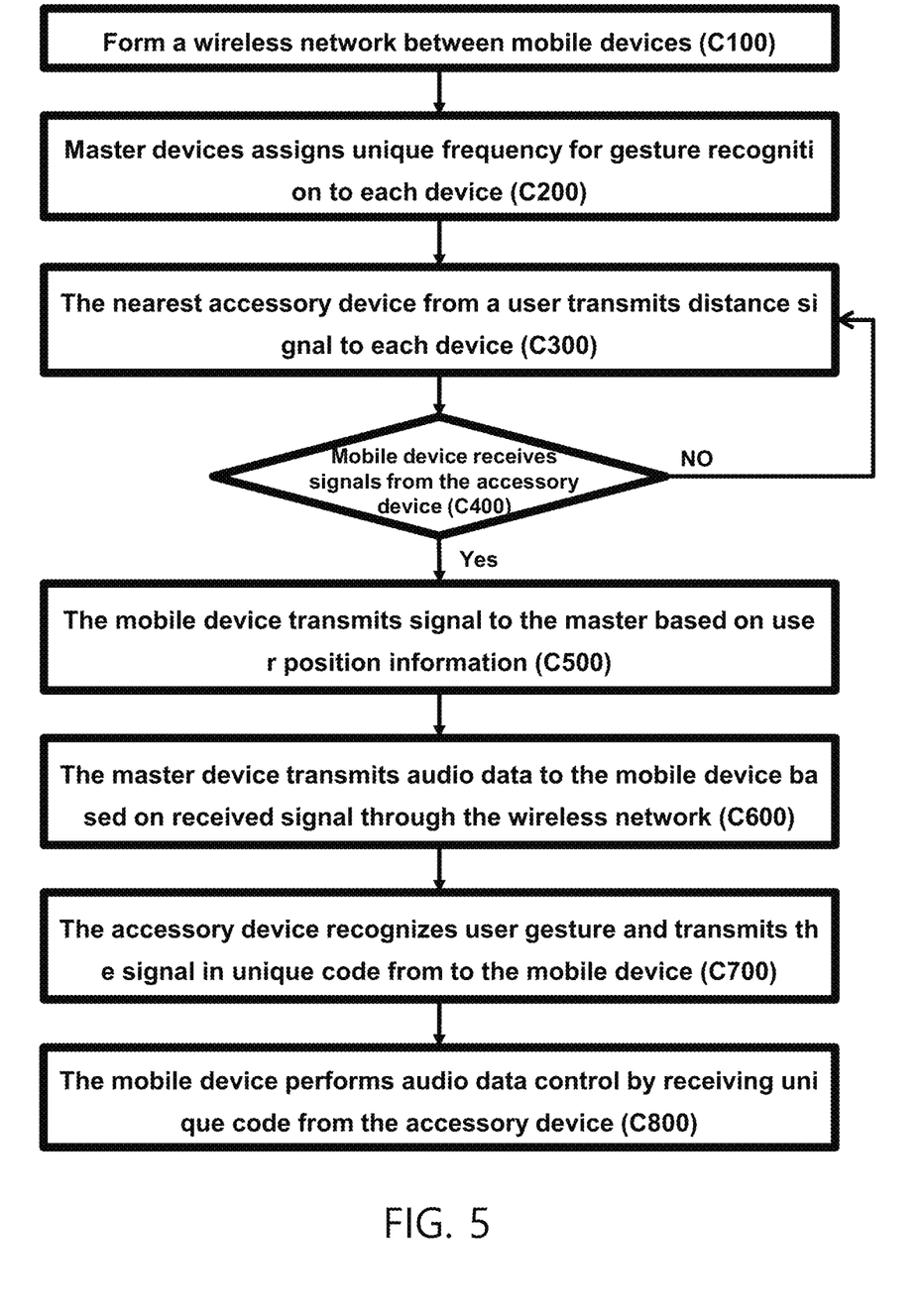
FIG. 5 is flowchart of an audio data control method for receiving and sending signals of plural mobile devices, a master device, and an accessory device in accordance with one or more embodiments of the present invention.

FIG. 5 is a flow diagram of a transmitting and receiving audio data control method between plural mobile devices, a master device, and an accessory device. Like FIG. 4, plural mobile devices may form a wireless network each other. In the C200 of FIG. 5, a master device may assigned frequencies to mobile devices in the network. Which means, it is easy to recognize request or acknowledgement between mobile devices with minimizing signal interference of all devices. At this moment, if the accessory device is connected into the network, the master device may assign frequency for it. Furthermore, when the accessory device receives frequency information of other devices from the master device, it may activate a specific mobile device by transmitting corresponding frequency to the mobile device. Smartwatch or remote controller near a user may be an example of the accessory device.

The C300 of FIG. 5 represents a step of transmitting signal from the accessory device near a user to a mobile device. For transmitting methods, wireless network, assigned frequency which is assigned by the master device in the network, and unique frequency of the accessory device, outside of assigned frequency from the master device, may be used between mobile devices. The C400 is a step of the mobile device receiving signals from the accessory device near a user. The mobile device that received signals, may transmit signals to the master device based on the user detection information (C500). At this moment, the master device may decides the closest mobile device from the accessory device and transmits audio data to the closet mobile device at the accessory device using wireless network only if the audio data is saved in the master device. Also, the master device may requests audio data, in case of the audio data is saved in another mobile device in the network, and the requesting method may use assigned frequency or wireless network. In conclusion, the audio data is transmitted to the closest mobile device from the user and the user may control audio data.

The C700 of FIG. 5 is a step of transmitting user gesture recognition information to a mobile device using an accessory device. The accessory device may use its gyro sensor to recognize user gesture and transmits corresponding signals to the mobile device. At this moment, the transmitted signal may be in form of unique code using a frequency of the accessory device or the mobile device. For another embodiment of the present invention, an inaudible high frequency signal may be transmitted as a Morse code which represents audio data control order based on user gesture recognition. The C800 of FIG. 5 represents a step of activation of controlling audio data from the mobile device based on received signal from the accessory device. The mobile device may control audio data based on received signal from the accessory device and controls may include followings: play, pause, next, previous, volume up, volume down, tone up, tone down or playlist control.

Related to methods and apparatuses in embodiments of the present invention, aforementioned methods may be applied. Therefore, the same information about apparatuses with aforementioned methods, have been omitted.

Aforementioned explanation of the present invention is just for exemplary and it may be easy to understand, for those who have knowledge in the field, that the present invention could be applied in several embodiments without changing core characteristics or technology fact. Therefore, embodiments of the present invention is not limited to aforementioned embodiments.

Limitation of the present invention may be represented in the patent claim limitation instead of detailed embodiments, and every transformed or changed method that are deducted from the patent claim limitation, may be interpreted as inclusion of the present invention.

The invention claimed is:
1. A method of operating a single device to generate prioritized control signals depending on user movement, user level, or both, the method comprising the step of:
   a. emitting, by the single device, a first mechanical inaudible signal having a first predetermined frequency outside the human audible spectrum, the emitted first mechanical inaudible signal interacting with at least one user within an area of effect, wherein the interaction is at least one of reflection and refraction, and wherein the first predetermined frequency associated with a first user level;
   b. detecting, by the single device, the interacted mechanical inaudible signal, the detected signal having a detected signal frequency;
   c. processing, by the single device, the detected signal to determine movement of the one user by comparing the detected signal frequency to the first predetermined frequency;
   d. controlling operations of the single device based on the detected user movement;
   e. transmitting a signal based on the detected user movement for control of operations of a first external device;
   f. detecting, by the single device, a second mechanical inaudible signal having at least a second predetermined frequency outside the human audible spectrum, the second mechanical inaudible signal from a handheld device, the second predetermined frequency different than the first predetermined frequency and wherein the second predetermined frequency associated with a second user level;

g. controlling, at the second user level, operations of the single device, the second user level higher than the first user level; and h. transmitting a signal based on the second user level for control of operations of the first external device.

2. The method recited in claim 1 wherein the signal based on the second user level is generated when the handheld device is located within a threshold distance.

3. The method recited in claim 1 wherein the operations of the single device comprise audio playback.

4. The method recited in claim 1 wherein the second mechanical inaudible signal is associated with user information of the handheld device.

5. A single device configured to generate prioritized control signals depending on user movement, user level, or both, the device comprising:

a. a speaker operable to emit a first mechanical inaudible signal having a first predetermined frequency outside the human audible spectrum, the emitted first mechanical inaudible signal interacting with at least one user within an area of effect, wherein the interaction is at least one of reflection and refraction, and wherein the first predetermined frequency associated with a first user level;

b. a microphone operable to detect the interacted mechanical inaudible signal, the detected signal having a detected signal frequency;

c. a processor operable to process the detected signal to determine movement of the one user by comparing the detected signal frequency to the first predetermined frequency;

d. wherein the processor further operable to control operations of the single device based on the user movement;

e. a transmitter operable to transmit a signal based on the user movement for control of operations of a first external device;

f. wherein the microphone further operable to detect a second mechanical inaudible signal having at least a second predetermined frequency outside the human audible spectrum, the second mechanical inaudible signal from a handheld device, the second predetermined frequency different than the first predetermined frequency and wherein the second predetermined frequency associated with a second user level;

g. wherein the processor further operable to control, at the second user level, operations of the single device, the second user level higher than the first user level; and h. wherein the transmitter operable to transmit a signal based on the second user level for control of operations of the first external device.

6. A system comprising a plurality of devices, the system comprising:

a. a first device of the plurality of devices, the first device including i. a speaker operable to emit a first mechanical inaudible signal having a first predetermined frequency outside the human audible spectrum, the emitted first mechanical inaudible signal interacting with at least one user within an area of effect, wherein the interaction is at least one of reflection and refraction, and wherein the first predetermined frequency associated with a first user level;

ii. a microphone operable to detect the interacted mechanical inaudible signal, the detected signal having a detected signal frequency;

iii. a processor operable to process the detected signal to determine movement of the one user by comparing the detected signal frequency to the first predetermined frequency;

iv. wherein the processor further operable to control operations of the single device based on the user movement;

v. a transmitter operable to transmit a signal based on the determined user movement for control of operations of a first external device;

vi. wherein the microphone further operable to detect a second mechanical inaudible signal having at least a second predetermined frequency outside the human audible spectrum, the second mechanical inaudible signal from a handheld device, the second predetermined frequency different than the first predetermined frequency and wherein the second predetermined frequency associated with a second user level;

vii. wherein the processor further operable to control, at the second user level, operations of the single device, the second user level higher than the first user level;

viii. wherein the transmitter operable to transmit a signal based on the second user level for control of operations of the first external device; and b. wherein the handheld device operable to emit the second mechanical inaudible signal.

* * * * *